(12) United States Patent
Tuel

(10) Patent No.: US 7,484,215 B2
(45) Date of Patent: Jan. 27, 2009

(54) METHOD, SYSTEM AND PROGRAM PRODUCT FOR PROCESSING A TRANSACTION

(75) Inventor: Anthony R. Tuel, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 856 days.

(21) Appl. No.: 10/697,917

(22) Filed: Oct. 30, 2003

(65) Prior Publication Data
US 2005/0097555 A1   May 5, 2005

(51) Int. Cl.
G06F 9/46 (2006.01)
G06F 7/00 (2006.01)
G06F 17/30 (2006.01)
G06F 11/00 (2006.01)

(52) U.S. Cl. .......................... 718/101; 718/104; 707/1; 714/2; 714/16

(58) Field of Classification Search .................. 718/101, 718/104; 707/1, 10; 709/201; 714/1–2, 714/15–16, 100
See application file for complete search history.

(56) References Cited

U.S. PATENT DOCUMENTS

| | | | | |
|---|---|---|---|---|
| 5,208,748 A | * | 5/1993 | Flores et al. ................... 704/1 |
| 5,261,089 A | * | 11/1993 | Coleman et al. ................ 707/8 |
| 5,319,773 A | * | 6/1994 | Britton et al. .................. 714/15 |
| 5,613,060 A | * | 3/1997 | Britton et al. ................ 718/100 |
| 5,781,910 A | * | 7/1998 | Gostanian et al. ........... 707/201 |
| 6,058,388 A | * | 5/2000 | Molloy ........................... 707/1 |
| 6,105,147 A | * | 8/2000 | Molloy ......................... 714/16 |
| 6,434,555 B1 | * | 8/2002 | Frolund et al. ................ 707/10 |
| 6,493,826 B1 | * | 12/2002 | Schofield et al. .............. 726/22 |
| 7,082,432 B2 | * | 7/2006 | Bhogi et al. ................... 707/10 |
| 2004/0210590 A1 | * | 10/2004 | Somogyi ..................... 707/100 |
| 2004/0215594 A1 | * | 10/2004 | Somogyi et al. ............... 707/1 |
| 2004/0216107 A1 | * | 10/2004 | Somogyi et al. ............. 718/100 |

FOREIGN PATENT DOCUMENTS

WO   WO 2004068294 A2 *   8/2004

OTHER PUBLICATIONS

"Distributed Transaction Processing: The XA Specification," 1991, X/Open Company, pp. 1-80.*

* cited by examiner

Primary Examiner—Meng-Ai An
Assistant Examiner—Qing-Yuan Wu
(74) Attorney, Agent, or Firm—A. Bruce Clay; Hoffman Warnick LLC

(57) ABSTRACT

A method, system and program product for processing a transaction that requires multiple resources. The multiple resources for the transaction are concurrently prepared and/or committed. Further, a response can be sent to a requester before one or more of the resources has been committed. The resources can be prepared/committed using non-blocking function calls, using separate threads, or the like.

20 Claims, 3 Drawing Sheets under the present invention, a method, system and program product for processing transactions are provided in which the preparation and/or commitment of the resources are performed concurrently. In particular, after receiving a transaction request, preparation of all the resources for the transaction is requested without waiting to receive a preparation response for a previous resource. Each request can be made using a non-blocking function call or by using a unique thread. In any event, the resources are concurrently prepared. Should the resources require commitment or roll back, these operations can also be performed concurrently. In order to further improve processing, a transaction response can be sent to a requester before the resources are committed or rolled back.

METHOD, SYSTEM AND PROGRAM PRODUCT FOR PROCESSING A TRANSACTION

BACKGROUND OF THE INVENTION

1. Technical Field

The invention relates generally to processing transactions, and more specifically, to a solution for more efficiently processing and/or responding to a request for a transaction that requires multiple resources.

2. Background Art

Many transactions require that operations be performed on multiple resource managers and/or multiple resources under the same resource manager. For example, a distributed XA transaction may be requested that requires entries to be added and/or changed in multiple databases. In these transactions, it is typically desired that either all the operations occur successfully or none of the operations occur at all. In order to ensure this, the operations can be performed using the XA protocol, which supports a two phase process. In the first phase, each resource is "prepared." Preparing a resource includes providing the operation to the resource manager, performing the operation on the resource, and obtaining and temporarily storing result(s) for the operation. The result(s) from the resource manager is then returned to a transaction manager that manages the entire transaction. When the returned results indicate that all operations were successful, each resource can be "committed" in the second phase. Committing a resource includes making the result(s) of the operation permanent in the resource. However, if the returned results indicate that one or more operations failed, then each resource can instead be "rolled back" in the second phase. Rolling back a resource includes undoing the result(s) of the operation performed when the resource was prepared in the first phase as well as any operations performed on the resource prior to the preparation.

Typically, in processing a transaction that spans multiple resources, each resource is serially prepared and serially committed or rolled back. For example, when two resources are required, the first resource is prepared, and when a successful preparation response is received, the second resource is prepared. Assuming both resources are prepared successfully, the first resource is committed followed by committing the second resource. Once both resources have been successfully committed, the transaction manager provides a response to the requester.

Serially processing resources for the transaction can be inefficient. For example, one or more resources may have a separate resource manager that is concurrently performing actions for other systems. As a result, when the transaction manager requests that the resource manager perform an operation, there may be some delay before the operation is performed and a response is received. When numerous resources are required for a transaction, these delays can accumulate into a substantial delay in responding to the transaction request.

As a result, a need exists for an improved solution for processing transactions that require multiple resources. In particular, a need exists for a method, system and program product that more efficiently process a transaction by simultaneously preparing and/or committing resources before replying to the requester.

SUMMARY OF THE INVENTION

The invention provides an improved solution for processing transactions that require multiple resources. Specifically, A first aspect of the invention provides a method of processing a transaction that requires a plurality of resources, the method comprising: requesting preparation of a first resource; and requesting preparation of a second resource before receiving a preparation response from the first resource.

A second aspect of the invention provides a method of processing a transaction, the method comprising: concurrently preparing a plurality of resources for the transaction; waiting for a preparation response for each of the plurality of resources; and concurrently committing the plurality of resources.

A third aspect of the invention provides a system for processing a transaction that requires a plurality of resources, the system comprising: a reception system for receiving a transaction request from a requester; and a preparation system for concurrently preparing the plurality of resources for the transaction.

A fourth aspect of the invention provides a program product stored on a recordable medium for processing a transaction, which when executed comprises: program code for requesting preparation of a plurality of resources for the transaction; program code for simultaneously waiting for a preparation response for each of the plurality of resources; and program code for requesting at least one of: commitment and roll back of the plurality of resources.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for processing transactions that require multiple resources. Specifically, under the present invention, a method, system and program product for processing transactions are provided in which the preparation and/or commitment of the resources are performed concurrently. In particular, after receiving a transaction request, preparation of all the resources for the transaction is requested without waiting to receive a preparation response for a previous resource. Each request can be made using a non-blocking function call or by using a unique thread. In any event, the resources are concurrently prepared. Should the resources require commitment or roll back, these operations can also be performed concurrently. In order to further improve processing, a transaction response can be sent to a requester before the resources are committed or rolled back.

As used throughout this discussion, the term "transaction" is used to describe any type of desired action that requires one or more operations to be performed on one or more resources. The term "resources" is used to describe any type of input device, output device, storage device, etc. For example, a resource may comprise a database, a webserve queue, a Java Messaging Services (JMS) provider, a downstream server, etc. Further, it is understood that an "operation" on a resource could comprise multiple actions that are to be performed on the resource. For example, a transaction could comprise updating a table in one database, and updating two tables in another database. In this case, the transaction could be described as comprising an operation for one resource and an operation for a second resource. Still further, it is understood that various problems can arise to cause an operation on a resource to fail. For example, when the resource is a database, the operation could identify a table that does not exist, an entry that is not present in a table, etc. Further, the resource may not perform the operation within a predetermined time period, insufficient memory may be available, the resource may be temporarily unavailable, etc.

Figure 1:
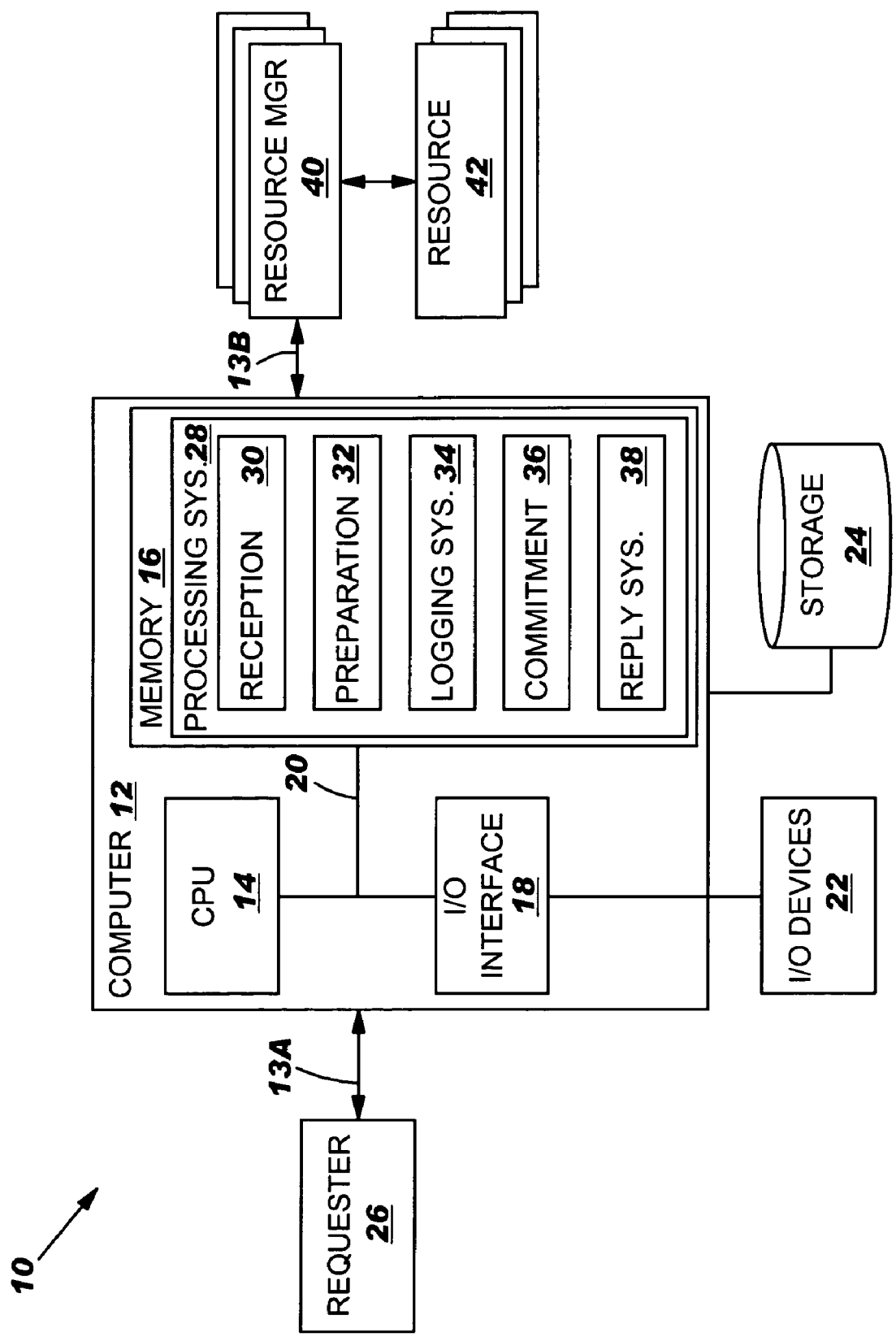
FIG. 1 shows an illustrative system for processing transactions according to one embodiment of the invention.

Turning to the drawings, FIG. 1 shows an illustrative system 10 for processing transactions. In particular, a computer 12 can receive a transaction request from a requester 26 over a communications link 13A. In processing the transaction, computer 12 can request that one or more resource managers 40 perform an operation on one or more resources 42 over communications link 13B. To this extent, each communications link 13A-B can comprise a direct hardwired connection (e.g., serial port) or another type of network connection. In the latter case, the network can comprise an addressable connection in a client-server (or server-server) environment that may utilize any combination of wireline and/or wireless transmission methods. In this instance, computer 12, requester 26, and resource managers 40 may utilize conventional network connectivity, such as Token Ring, Ethernet, WiFi or other conventional communications standards. Further, the network can comprise any form of network, including the Internet, a wide area network (WAN), a local area network (LAN), a virtual private network (VPN), etc. Where, for example, requester 26 communicates with computer 12 via the Internet, connectivity could be provided by conventional TCP/IP sockets-based protocol, and requester 26 could utilize an Internet service provider to establish connectivity to computer 12.

As shown, computer 12 generally includes central processing unit (CPU) 14, memory 16, input/output (I/O) interface 18, bus 20, external I/O devices/resources 22, and a storage unit 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Storage unit 24 may comprise any type of data storage for providing storage for information necessary to carry out the invention as described below. As such, storage unit 24 may include one or more storage devices, such as a magnetic disk drive or an optical disk drive. Moreover, similar to CPU 14, memory 16 and/or storage unit 24 may reside at a single physical location, comprising one or more types of data storage, or be distributed across a plurality of physical systems in various forms. Further, memory 16 and/or storage unit 24 can include data distributed across, for example, a LAN, WAN or a storage area network (SAN) (not shown).

I/O interface 18 may comprise any system for exchanging information to/from external devices. I/O devices 22 may comprise any known type of external device, including speakers, a CRT, LED screen, handheld device, keyboard, mouse, voice recognition system, speech output system, printer, monitor/display, facsimile, pager, etc. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Further, it is understood that computer 12 comprises any type of computing device capable of communicating with one or more other computing devices (e.g., requester 26), such as a server, a desktop computer, a laptop, a handheld device, a mobile phone, a pager, a personal data assistant, etc. Similarly, requester 26 can comprise any type of computing device. To this extent, requester 26 typically includes the same elements as shown in computer 12 (e.g., CPU, memory, I/O interface, etc.). These have not been separately shown and discussed for brevity. It is understood, however, that if computer 12 is a handheld device or the like, a display could be contained within computer 12, and not as an external I/O device 22 as shown. Still further, each resource manager 40 can comprise a component in a system that includes the managed resource(s) 42. Each resource manager 40 can communicate with other computing devices, and can manage the processing of operations on one or more resources 42. To this extent, each resource manager 40 can manage the implementation of the two phase processing (e.g., preparation followed by commitment or roll back) on a resource 42.

Shown stored in memory 16 is a processing system 28 for processing transactions. Processing system 28 is shown including a reception system 30, a preparation system 32, a logging system 34, a commitment system 36, and a reply system 38. In general, reception system 30 can receive a transaction request for a transaction that requires multiple resources 42. Preparation system 32 can process the preparation phase of the transaction, logging system 34 can log the results of the preparation of resources 42, and commitment system 36 can process the commitment/roll back phase of the transaction. Reply system 38 can reply back to, for example, requester 26 with a transaction result.

As noted, reception system 30 can receive a transaction request from, for example, requester 26. Alternatively, it is understood that a user (not shown) could operate computer 12 and generate one or more transaction requests that are sent to processing system 28 for processing, and are received by reception system 30. In any event, when reception system 30 receives a transaction request, it can determine the number of resources 42 that are required for the transaction. For example, the transaction request may identify each required resource 42, or reception system 30 can analyze the transaction request to determine the required resource(s) 42. When a transaction request only requires a single resource 42, processing system 28 can process the transaction in a single phase, i.e., the result of the operation for the transaction is permanently stored in resource 42 immediately. This can be performed without using preparation system 32 and commitment system 36.

However, when reception system 30 determines that the requested transaction requires multiple resources 42, it can forward the transaction request to preparation system 32 for processing the preparation phase of the transaction. To this extent, preparation system 32 can request the resource manager 40 of a resource 42 required for the transaction to prepare the corresponding resource 42. Further, preparation system 32 could prepare one or more of the required resources 42 without the use of a resource manager 40. In any event, the required resources 42 for the transaction are concurrently prepared.

In one embodiment, preparation system 32 comprises a single execution thread that requests preparation of each resource 42 without waiting to receive a preparation response from a previous resource 42. To this extent, each request could be made in a non-blocking manner. For example, preparation system 32 can use a non-blocking function call that requests resource manager 40 to prepare resource 42, but does not wait to receive a preparation response from the resource managers 40. Alternatively, a non-blocking standard query language (SQL) call or the like could be made to a resource 42 directly from the execution thread. Once all resources 42 are being prepared, preparation system 32 can wait for a preparation response to be received for each resource 42.

In another embodiment, preparation system 32 can use a unique resource thread for each resource 42. For example, preparation system 32 can comprise a main execution thread that starts a unique resource thread to process the preparation of each resource 42. To this extent, a resource thread can request that a resource manager 40 prepare the resource 42, and wait to receive the preparation response for the resource 42. Alternatively, a resource thread could prepare the resource 42 by, for example, making a SQL call that blocks, and returns a preparation response once the resource has been prepared. In any event, once the resource 42 has been prepared, and a preparation response is available, the resource thread can return the preparation response to the main execution thread and terminate. Once all the resource threads have returned preparation responses, the main execution thread can continue processing the transaction.

For further processing of the transaction, preparation system 32 can provide all the preparation responses to logging system 34. Logging system 34 can log a preparation result for the transaction based on the preparation responses. In particular, logging system 34 can analyze the various preparation responses and determine a preparation result for the transaction. For example, a preparation response may indicate that the operation was successful or failed, and/or may return data for the operation. This information can be collected for the various resources 42 and compiled into a preparation result for the transaction.

After logging system 34 has generated a preparation result for the transaction, commitment system 36 can commit or roll back the various resources 42. In particular, if one or more of the operations on resources 42 failed during preparation, commitment system 36 can roll back all resources 42 to their state before the operations were performed. Alternatively, when all the operations on resources 42 are successfully prepared, commitment system 36 can commit the results of the operations on each resource 42, thereby making them permanent.

Similar to preparation system 32, commitment system 36 can concurrently commit or roll back resources 42. In particular, commitment system 36 can comprise a single execution thread that requests commitment of all resources 42 without waiting for a commitment response from any resource, and subsequently waits to receive all commitment responses. Alternatively, commitment system 36 can comprise a main execution thread that creates or retrieves from a thread pool a unique resource thread for each resource 42. Each resource thread can request commitment of resource 42, wait to receive a commitment response for resource 42, return the commitment response to the main execution thread, and terminate. It is understood that commitment system 36 can also roll back resources 42 in an identical manner.

When preparation system 32 and commitment system 36 both use resource threads for preparing and committing/rolling back resources 42, it is understood that the same resource threads could be used for both operations. For example, after preparing a resource 42 and providing the preparation result to the main thread, a resource thread can wait to receive a command from the main execution thread to commit or roll back resource 42. In this case, the main execution thread can wait for all the preparation results, determine whether preparation of one or more resources 42 failed, and send the command to each resource thread to either commit or roll back the corresponding resource 42. Subsequently, the main execution thread can wait to receive a commitment (roll back) result for each resource 42 before continuing processing the transaction.

As noted previously, reply system 38 sends a reply to, for example, requester 26 based on a transaction result. The transaction result can be based on the preparation results and/or the commitment (roll back) results for resources 42. In particular, when the preparation of one or more resources 42 fails, the transaction result can indicate that preparation of the transaction failed. However, when all resources 42 are prepared successfully, the transaction result can comprise the preparation result. Further, the transaction result may indicate that one or more resources 42 were unable to be committed (rolled back) after a certain amount of time.

However, in many systems, it can be safely assumed by requester 26 that all resources 42 will be successfully committed or rolled back. For example, a resource 42 may only fail to be successfully committed when an heuristic exception occurs, e.g., it loses power or the like. In this case, resource manager 40 for resource 42 and/or processing system 28 will recognize this failure when power is restored to resource 42 and commit the results. Because of this, reply system 38 may reply to requester 26 before resources 42 have been committed to further decrease the amount of time to that requester 26 must wait for a reply.

Figure 2:
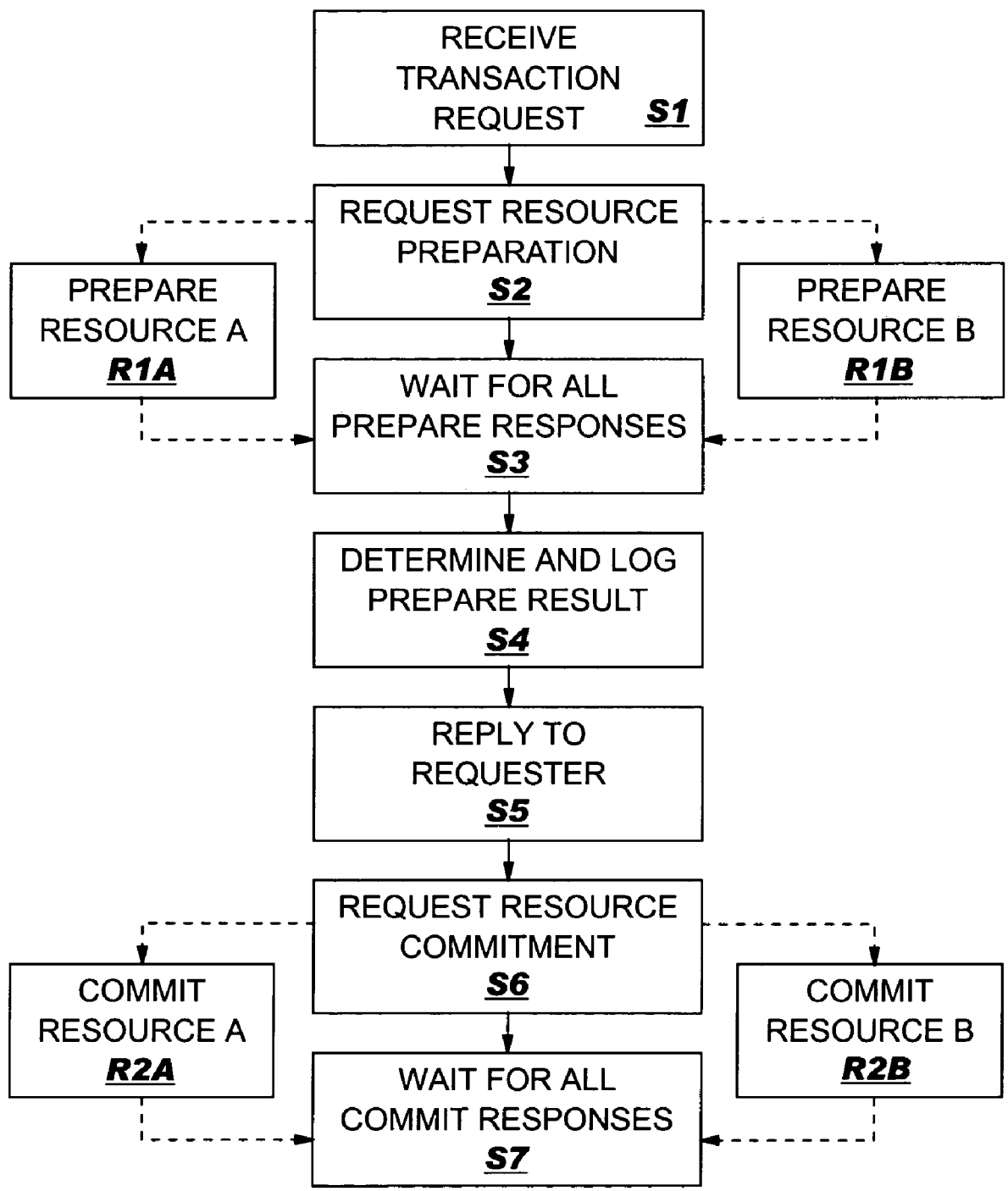
FIG. 2 shows an illustrative flow diagram for processing a transaction according to another embodiment of the invention.

FIG. 2 shows an illustrative flow diagram for processing a transaction that requires multiple resources using a single execution thread. As shown, a transaction request is received in step S1, and in step S2, the execution thread requests preparation of resources 42 (FIG. 1). In steps R1A-B, resources 42 are prepared concurrently by the corresponding resource managers 40 (FIG. 1), while in step S3, the execution thread waits for all the preparation responses. In step S4, the execution thread determines a preparation result for the transaction based on the preparation responses and logs the preparation result. As noted previously, in step S5, the execution thread can reply to requester 26 (FIG. 1) based on the preparation result before resources 42 are committed. In step S6, the execution thread requests that resources 42 be committed, and in steps R2A-B resources 42 are concurrently committed by resource managers 40, while in step S7, the execution thread waits to receive all commitment responses before continuing processing.

Figure 3:
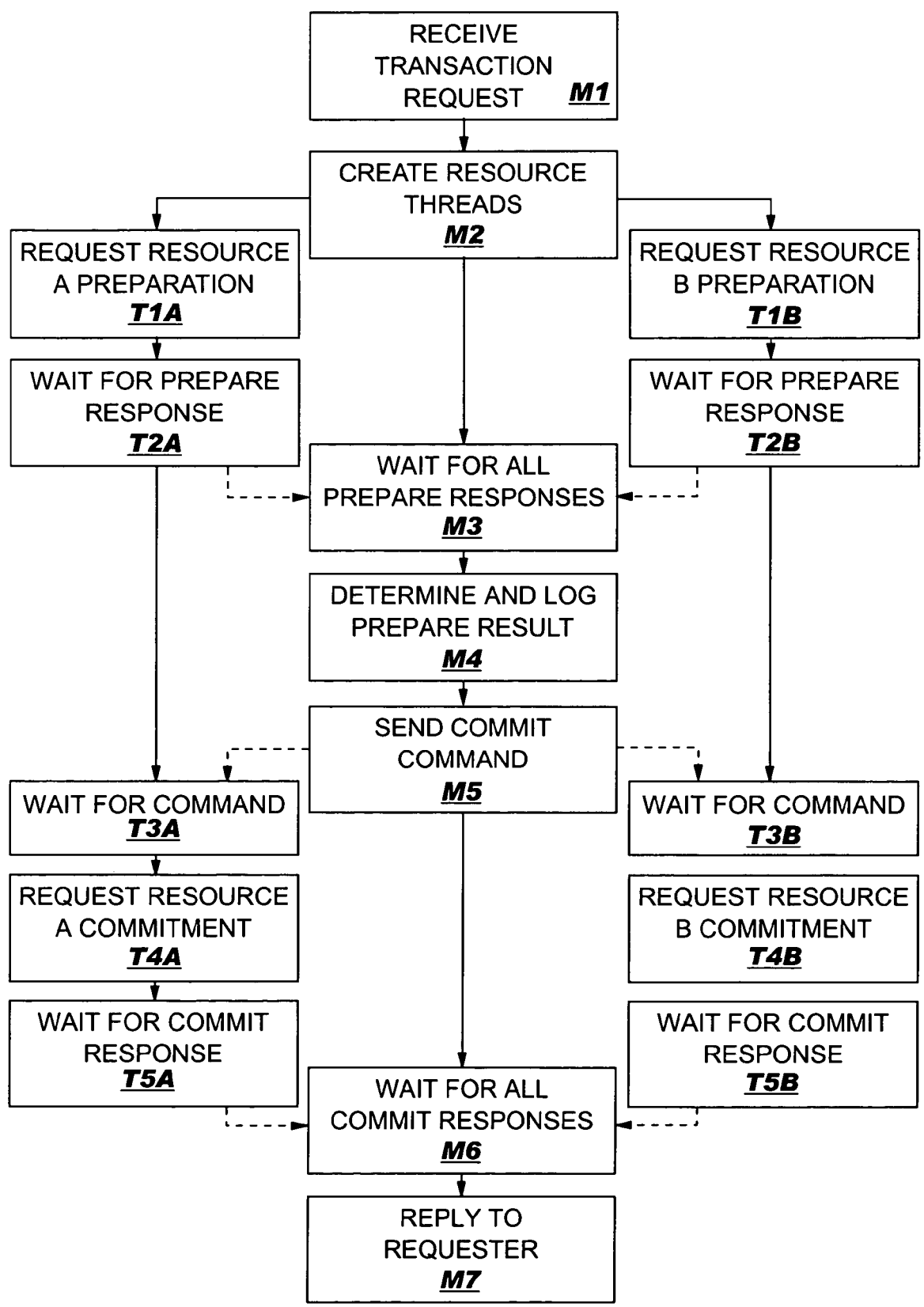
FIG. 3 shows an illustrative flow diagram for processing a transaction according to yet another embodiment of the invention.

FIG. 3 shows another illustrative flow diagram for processing a transaction that requires multiple resources using multiple threads. As shown, in step M1, a main execution thread can receive a transaction request, and in step M2, the main execution thread can create a unique resource thread for each resource 42 (FIG. 1). In steps T1A-B, the resource threads can request preparation of resources 42. In steps T2A-B, each resource thread can wait for a preparation response for the corresponding resource 42, while in step M3, the main execution thread can wait to receive all the preparation responses for resources 42 from the resource threads. In step M4, the main execution thread determines a preparation result for the transaction and logs the preparation result, while in steps T3A-B, each resource thread waits for a command from the main execution thread to either commit or roll back resources 42. Assuming the preparation result indicates that resources 42 were successfully prepared, the main execution thread can request that resources 42 be committed in step M5. In steps T4A-B, each resource thread can request that the corresponding resource 42 be committed. In steps T5A-B, each resource thread can wait for a commitment response for the resource 42, while in step M6, the main execution thread can wait to receive commitment responses for all resources 42. In step M7, the main execution thread can reply to the requester once all resources 42 have been successfully committed.

It is understood that both flow diagrams shown in FIGS. 2 and 3 are merely illustrative, and various alternatives are possible. For example, in FIG. 2, the reply can be sent after all resources 42 have been committed. Similarly, in FIG. 3, the reply can be sent before resources 42 are committed. Additionally, only the preparation phase or the commitment phase may be performed concurrently. Still further, the main execution thread could continue processing and allow one or more separate threads to wait for resources 42 to be successfully committed.

Further, while shown and discussed with reference to two resources, it is understood that a transaction can require any number of resources. Still further, it is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer (e.g., a finite state machine), containing specialized hardware for carrying out one or more of the functional tasks of the invention, could be utilized. The present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of processing a transaction that requires a plurality of resources, the method comprising:
    requesting preparation of a first resource required by the transaction, wherein the transaction is automatically processed by a computer using a plurality of resources;
    requesting preparation of a second resource required by the transaction before receiving a preparation response from the first resource;
    receiving a preparation response for each of the first and second resources;
    replying to a requester based on the preparation responses, the reply including a transaction result that includes one of: a success or failure of processing the transaction; and
    requesting, after the replying, one of: a commitment or a roll back of each resource based on the preparation responses.

2. The method of claim 1, further comprising logging a preparation result for the transaction based on the preparation responses.

3. The method of claim 1, further comprising receiving a transaction request from a requester.

4. The method of claim 1, wherein a unique resource thread implements the requests for each resource.

5. The method of claim 4, further comprising retrieving the unique resource thread for each resource after receiving the corresponding preparation response.

6. The method of claim 1, further comprising simultaneously waiting for one of: a commitment response or a roll back response for each resource.

7. The method of claim 1, wherein each request is preformed using a non-blocking function call.

8. A method of processing a transaction, the method comprising:
    concurrently preparing a plurality of resources for the transaction, the preparing including performing a set of operations on each of the plurality of resources based on the transaction;
    waiting for a preparation response for each of the plurality of resources;
    replying to a requester after receiving the preparation responses, the reply including a transaction result that indicates on of: a success or failure of processing the transaction; and
    concurrently committing the plurality of resources to make the operations of the transaction permanent, wherein the committing is performed after the replying.

9. The method of claim 8, further comprising receiving a transaction request from a requester.

10. The method of claim 8, further comprising logging a preparation result for the transaction based on the preparation response for each of the plurality of resources.

11. The method of claim 8, wherein at least one of: the concurrently preparing or concurrently committing is implemented using a unique resource thread for each resource.

12. The method of claim 8, wherein at least one of: the concurrently preparing or concurrently committing is implemented using a non-blocking function call.

13. A system for processing a transaction that requires a plurality of resources, the system including at least one computer comprising:
   a reception system for receiving a transaction request from a requester;
   a preparation system for concurrently preparing the plurality of resources for the transaction, the preparing including performing a set of operations on each of the plurality of resources based on the transaction;
   a reply system for replying to the requester based on a preparation response for at least one of the plurality of resources, the reply including a transaction result that indicates one of: a success or failure of processing the transaction; and
   a commitment system for committing or rolling back the plurality of resources based on the at least one preparation response, wherein the reply system is configured to reply prior to completion of the committing or rolling back.

14. The system of claim 13, the at least one computer further comprising a logging system for logging a preparation result for the transaction based on a preparation response for each of the plurality of resources.

15. The system of claim 13, where in the commitment system concurrently commits or rolls back the plurality of resources.

16. The system of claim 13, wherein the preparation system creates a plurality of resource threads, and wherein each resource thread prepares a unique resource in the plurality of resources.

17. A program product stored on a storage unit for processing a transaction, which when executed comprises:
   program code for requesting preparation of a plurality of resources for the transaction, the preparation including performing a set of operations on each of the plurality of resources based on the transaction;
   program code for simultaneously waiting for a preparation response for each of the plurality of resources;
   program code for requesting at least one of: commitment or roll back of the plurality of resources based on at least one preparation response; and
   program code for replying to a requester based on the at least one preparation response, the reply including a transaction result that indicates one of: a success or failure of the processing the transaction wherein the program code for replying is configured to reply prior to requesting the at least one of: commitment or roll back.

18. The program product of claim 17, further comprising program code for receiving a transaction request from the requester.

19. The program product of claim 17, further comprising program code for logging a preparation result for the transaction based on the preparation response for each of the plurality of resources.

20. The program product of claim 17, the program code for requesting preparation including program code for creating a resource thread for a resource, wherein the resource thread terminates after preparing the resource.

* * * * *